3,322,169
SAWDUST COLLECTING MEANS FOR
RADIAL SAWS
Lester E. Hilliard, Des Moines, Iowa, assignor of one-half to Floyd T. Hilliard, Des Moines, Iowa
Filed Aug. 3, 1964, Ser. No. 386,939
10 Claims. (Cl. 143—6)

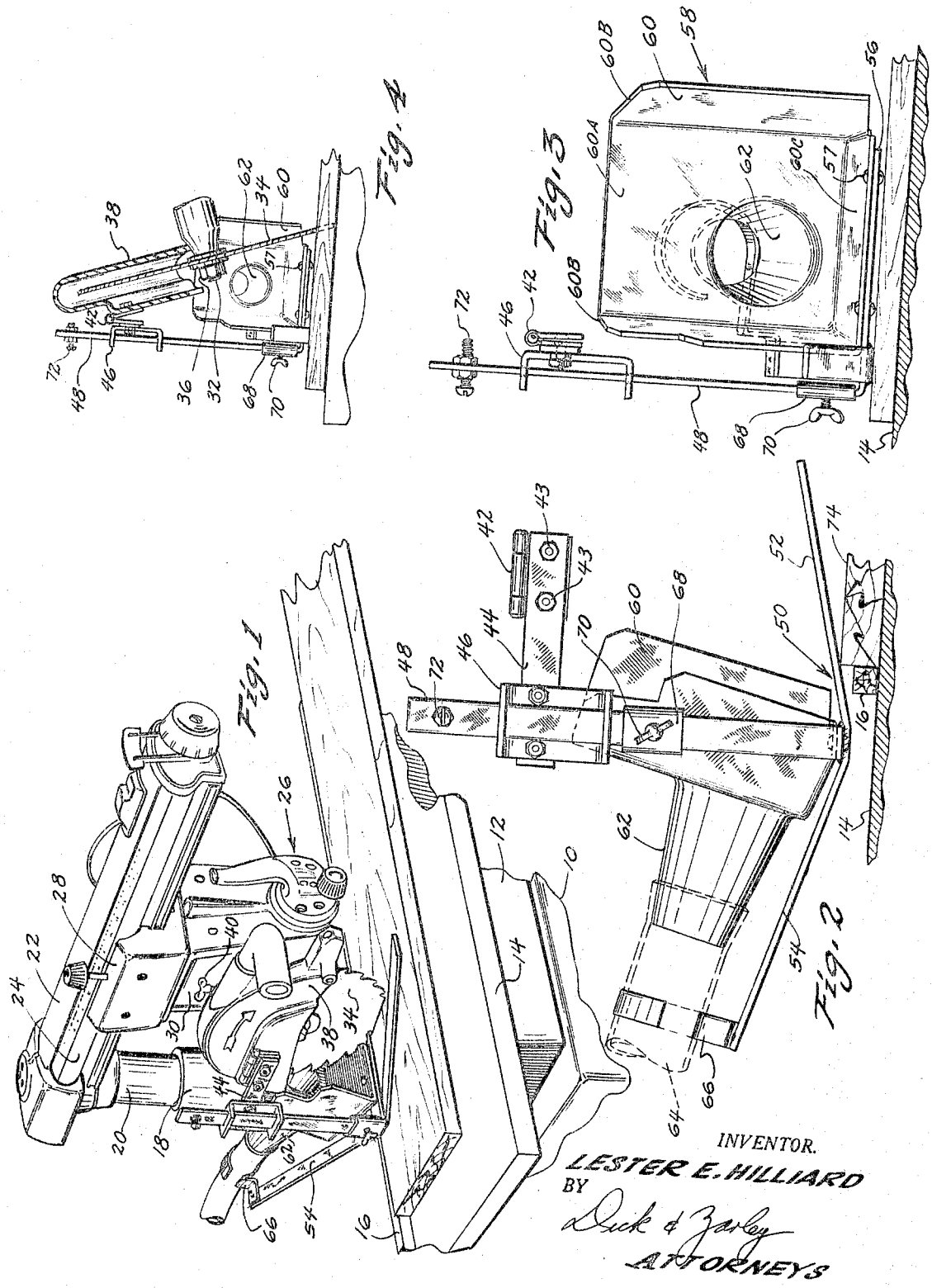

This invention relates to sawdust collecting means and more particularly to a sawdust collecting means adapted for use on radial saws.

Because of the great versatility in cutting positions achieved by the modern radial saw, it is extremely difficult to collect and control the sawdust resulting from these various cutting operations. This invention is specifically intended to solve the sawdust collecting problems of the radial saw without at all detracting from the versatility of the machine.

Therefore, a principal object of this invention is to provide a sawdust collecting means for radial saws that will permit the collection of sawdust regardless of the cutting position of the saw. More specifically, it is an object of this invention to provide a sawdust collecting means that will collect the sawdust from a radial saw during the cross cut, ripping and bevel cutting operations.

A still further object of this invention is to provide a sawdust collecting means for radial saws that is entirely safe to use.

A still further object of this invention is to provide a sawdust collecting means for radial saws that will not interfere with the operator's vision of the cutting operation.

A still further object of this invention is to provide a sawdust collecting means for radial saws that will not have its function adversely affected by varying thicknesses of the material being cut.

A still further object of this invention is to provide a sawdust collecting means for radial saws that will not in any way interfere with any of the conventional cutting operations of the radial saw.

A still further object of this invention is to provide a sawdust collecting means for radial saws that is easily adapted to existing equipment.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawing, in which:

FIGURE 1 is a perspective view of the device of this invention mounted on a radial saw in a cross-cut position;

FIGURE 2 is a side elevational view of the sawdust collecting means of this invention as it is removed from the saw but held in a position similar to the position shown in FIGURE 1;

FIGURE 3 is a frontal elevational view of the sawdust collecting means of this invention as viewed from the right of FIGURE 2; and FIGURE 4 is a partial sectional view taken through the saw guard and saw blade during a bevel cut and shows the sawdust collecting means in a position substantially similar to that of FIGURE 3. The drawing in FIGURE 4 is at a reduced scale as compared to that of FIGURE 3.

The numeral 10 denotes a conventional saw bench upon which the saw base 12 is mounted in any convenient fashion. A cutting table 14 is horizontally disposed on the saw base 12 and fence 16 is disposed thereon in the usual manner. A vertical column 18 extends upwardly from the rearward portion of base 12 and cylindrical spindle 20 is rotatably mounted therein. A horizontal arm 22 extends generally forwardly from the top of spindle 20 and track means 24 appear on the parallel sides thereof.

A cutting head 26 is mounted on the track means 24 and is adapted for movement along the track means 24 at times. Cutting head 26 includes a track mount 28 which can be locked to the arm 22 by lock arm 29 whenever desired. A swivel motor 30 appears below the track mount 28 and the usual power shafts 32 extends laterally outwardly therefrom. A conventional saw blade 34 is secured to the power shaft 32 by means of a conventional arbor nut 36. Saw guard 38 is conventionally mounted on the cutting head 26 and is adjustably secured thereto by wing nut 40. It will be understood that the above described structure is conventional and does not of itself comprise a part of this invention. It is also understood that the conventional controls and components are included in the above described structure to permit the cutting head 26 to be adjustably secured to the arm 22; to permit the arm 22 to be selectively locked in various angular positions in a horizontal plane with respect to column 18; to permit the motor 30 and saw blade 34 to be pivoted with respect to arm 22 to assume positions for ripping or bevel sawing operations.

A hinge 42 has one of its movable components secured to the side of saw guard 38 opposite to cutting head 26. This connection can be accomplished by means of rivets, bolts or the like. The other portion of hinge 42 is secured to arm 44 by means of connecting elements 43. Arm 44 extends rearwardly from hinge 42 where it is rigidly secured to the back surface of C-shaped bracket 46. Slots appear in the upper and lower flanges of bracket 46 and the vertical portions of L-shaped bar 48 slidably extends through these slots. A V-shaped bar 50 is secured in any convenient manner to the lower end of the vertical portion of bar 48. The forward portion of bar 50 extends forwardly and upwardly from a horizontal plane and the rearward portion 54 of bar 50 extends rearwardly and upwardly from a horizontal plane. It should be noted that the V-shaped bar 50 is substantially rectangular in cross-section with the longest cross-sectional dimension of the bar dwelling in a horizontal plane.

The horizontal portion 56 of bar 48 extends laterally away from the vertical portions of bar 48 and bisects an extension of the plane of saw blade 34 at a point rearwardly and in spaced relation to the saw blade. A transparent funnel means 58 of plastic or the like is secured to the horizontal portion 56 of bar 48 by means of rivets or the like 57. Funnel 58 includes a shroud 60 which is substantially rectangular in shape and which includes a rearward wall 60A, side wall 60B, and bottom 60C. A tapered hollow tube 62 extends rearwardly from wall 60A and is adapted for connection to a vacuum hose 64. The opposite end of the vacuum hose is adapted to be connected to any convenient source of vacuum. A hose supporting bracket 66 is secured in any convenient manner to the rearward end of the rearward portion 54 of V-shaped bar 50.

A lock bracket 68 loosely and slidably embraces the lower portion of the vertical part of the L-shaped bar 48 and set screw 70 on bracket 68 is adapted to selectively lock the bracket in position on the bar 48. A stop nut 72 is mounted on the top portion of bar 48 to limit the upper sliding movement of the bracket 46 with respect to the bar 48.

The normal operation of the device of this invention is as follows. The sawdust collecting means is secured to the saw guard 38 in the manner indicated above. When the saw is in the inoperative cross-cut position, the bottom of the V-shaped bar 50 will normally rest on the top of table 14 rearwardly of fence 16. While the bracket 68 is shown in an elevated position for illustrative purposes only in FIGURE 2, it normally is permitted to slide to the bottom of bar 48 as shown in FIGURE 1 during the cross-cut operation. The bar 48 is permitted to freely float or slide within the C-shaped bracket 46. The funnel 58 is disposed in a position directly behind the saw blade 34 and the rearward wall 60A of shroud 60 has a height greater than the height of the exposed portion of the blade 34 as it extends downwardly out of the saw guard 38.

After the saw has been started by conventional means, and as the cutting head 26 is drawn outwardly on arm 22 in the normal cross-cut operation, the forward portion 52 of V-shaped bar 50 engages the inner edge of board 74 as the entire sawdust collecting means moves forwardly with the saw. The board 74 imposes an upward thrust on the bar portion 54 as the bar portion 54 moves forwardly thereover and this causes the entire dust collecting means to move upwardly and this upward movement is controlled by means of the sliding action of bar 48 through the slots in C-shaped clamp 46. If the cross cutting action carries the saw blade and the bottom of the shroud 60 over the forward edge of the board 74, the return movement of the cutting head 26 back across the board will permit the rearward portion 54 of V-shaped bar 50 to engage the forward upper edge of the board to guide the sawdust collecting means over the board in the same manner that was experienced during the cutting operation. It should be noted that the tilted position of the funnel 58 (FIGURE 2) prevents the shroud 60 from interfering with the guiding action of the bar portion 54.

When the saw is set for a bevel cut (FIGURE 4), the hinge 42 comes into play and permits the sawdust collecting means to maintain its usual horizontal position even though the saw blade is tilted at an angle. The shroud 60 has a sufficient width to still dwell behind the blade during the most extreme bevel cuts.

The vacuum pump is started immediately prior to the commencement of each cutting operation and the sawdust is hurled rearwardly from the blade 34 in conventional fashion as the cutting action begins. The suction created by the vacuum pump pulls air and sawdust into the shroud 60, thence through the funnel portion 58, thence through the hose and downward through the pump to a convenient disposal collection point.

When the cutting blade 34 and motor are moved 90 degrees to a ripping position from the cross-cut position of FIGURE 1, the above described sawdust collecting means is also rotated 90 degrees. The lock bracket 68 is moved upwardly on bar 48 so that the distance between the top of the bracket 68 and the lower edge of the bracket 46 is substantially the same as the thickness of the board to be ripped. Thus, when the forward edge of the board engages the underside of the bar portion 52 of V-shaped bar 50 and forces the bar 48 upwardly, the bracket 68 will engage the lower edge of the bracket 46 as the bottom or lowermost portion of the V-shaped bar 50 engages the top of the board being ripped. This will permit the sawdust collecting means to hold the board against upward movement from the table 14 as the board is being moved through the saw during the ripping operation. Obviously, the sawdust is collected from the rearward edge of the saw blade 34 during the ripping operation in the same manner as described above.

Thus, from the foregoing, it is seen that a very efficient sawdust collecting means has been provided for the usual cutting operation of radial saws, and this invention is therefore seen to achieve all of its stated objectives.

Some changes may be made in the construction and arrangement of my sawdust collecting means for radial saws without departing from the real spirit and purpose of my invention, and it is my intention to cover by my claims, any modified forms of structure or use of mechanical equivalents which may be reasonably included within their scope.

I claim:
1. In combination with a radial saw means having a horizontal cutting table, a vertical support means extending upwardly from the rearward portion thereof, a horizontal arm extending outwardly over said cutting table from the upper end of said support means, a motor means movably mounted on said arm, a saw blade operatively secured to said motor means, and a saw blade guard secured to said motor means over the upper portion of said saw blade, and a sawdust collecting means comprising,
   a funnel means movably secured by securing means to said saw guard rearwardly of said saw blade and being adapted to receive sawdust deflected rearwardly from said blade,
   said securing means permitting vertical movement of said funnel means at times but rigidly holding said funnel means against rearward movement with respect to said saw guard,
   said funnel means being in communication with a collecting receptacle for any such sawdust.
2. The combination of claim 1 wherein a vacuum system is operatively connected to said funnel means.
3. The combination of claim 1 wherein said funnel means is pivotally secured to said saw guard by said securing means.
4. The combination of claim 1 wherein said funnel means is slidably secured to said saw guard by said securing means.
5. In combination with a radial saw means having a horizontal cutting table, a vertical support means extending upwardly from the rearward portion thereof, a horizontal arm extending outwardly over said cutting table from the upper end of said support means, a motor means movably mounted on said arm, a saw blade operatively secured to said motor means, and a saw blade guard secured to said motor means over the upper portion of said saw blade, and a sawdust collecting means comprising,
   a funnel means secured to said saw guard rearwardly of said saw blade and being adapted to receive sawdust deflected rearwardly from said blade,
   said funnel means being in communication with a collecting receptacle for any such sawdust,
   said funnel means being laterally pivotally connected to said saw guard,
   and connecting means between said saw guard and said funnel to permit the vertical sliding movement of said funnel means with respect to said saw guard.
6. The combination of claim 5, wherein said funnel means is substantially transparent.
7. In combination with a radial saw means having a horizontal cutting table, a vertical support means extending upwardly from the rearward portion thereof, a horizontal arm extending outwardly over said cutting table from the upper end of said support means, a motor means movably mounted on said arm, a saw blade operatively secured to said motor means, and a saw blade secured to said motor means over the upper portion of said saw blade, and a sawdust collecting means comprising,
   a funnel means secured to said saw guard rearwardly of said saw blade and being adapted to receive sawdust deflected rearwardly from said blade,
   said funnel means being in communication with a collecting receptacle for any such sawdust,
   said funnel means being vertically movably connected to said saw guard,
   and a tapered guide means is mounted on the lower end of said funnel means.
8. In combination with a radial saw means having a horizontal cutting table, a vertical support means extending upwardly from the rearward portion thereof, a horizontal arm extending outwardly over said cutting table from the upper end of said support means, a motor means movably mounted on said arm, a saw blade operatively secured to said motor means, and a saw blade secured to said motor means over the upper portion of said saw blade, and a sawdust collecting means comprising,
  a funnel means secured to said saw guard rearwardly of said saw blade and being adapted to receive sawdust deflected rearwardly from said blade,
  said funnel means being in communication with a collecting receptacle for any such sawdust,
  said funnel means being vertically movably connected to said saw guard,
  and a tapered guide means is mounted on the lower end of said funnel means, said guide means including a bar extending upwardly and forwardly from the bottom of said funnel, 9. In combination with a radial saw means having a horizontal cutting table, a vertical support means extending upwardly from the rearward portion thereof, a horizontal arm extending outwardly over said cutting table from the upper end of said support means, a motor means movably mounted on said arm, a saw blade operatively secured to said motor means, and a saw blade secured to said motor means over the upper portion of said saw blade, and a sawdust collecting means comprising,
  a funnel means secured to said saw guard rearwardly of said saw blade and being adapted to receive sawdust deflected rearwardly from said blade,
  said funnel means being in communication with a collecting receptacle for any such sawdust,
  said funnel means being vertically movably connected to said saw guard,
  and a tapered guide means is mounted on the lower end of said funnel means, said guide means including a V-shaped bar secured to the lower portion of said funnel means.

10. In combination with a radial saw means having a horizontal cutting table, a vertical support means extending upwardly from the rearward portion thereof, a horizontal arm extending outwardly over said cutting table from the upper end of said support means, a motor means movably mounted on said arm, a saw blade operatively secured to said motor means, and a saw blade secured to said motor means over the upper portion of said saw blade, and a sawdust collecting means comprising,
  a funnel means secured to said saw guard rearwardly of said saw blade and being adapted to receive sawdust deflected rearwardly from said blade,
  said funnel means being in communication with a collecting receptacle for any such sawdust,
  said funnel means being laterally pivotally connected to said saw guard,
  and connecting means between said saw guard and said funnel to permit the vertical sliding movement of said funnel means with respect to said saw guard,
  and means on said connecting means to limit the vertical sliding movement of said funnel means.

References Cited
UNITED STATES PATENTS

| | | |
|---|---|---|
| 1,999,138 | 4/1935 | Mason. |
| 2,399,239 | 4/1946 | Martin _____ 144—252 X |
| 2,623,554 | 12/1952 | Schutz _____ 143—157.2 |
| 2,876,810 | 3/1959 | Petersen _____ 143—159.7 |
| 3,135,151 | 6/1964 | Link et al. _____ 83—100 X |

DONALD R. SCHRAN, *Primary Examiner.*